Nov. 4, 1958 B. NIEDERMAN 2,859,416

FILTER

Filed July 18, 1955 2 Sheets-Sheet 1

INVENTOR
Bernard Niederman

BY Mueller & Aichele

Attys.

Nov. 4, 1958 B. NIEDERMAN 2,859,416

FILTER

Filed July 18, 1955 2 Sheets-Sheet 2

INVENTOR.
Bernard Niederman

BY Mueller & Aichele

Attys.

2,859,416

FILTER

Bernard Niederman, Chicago, Ill., assignor to Motorola, Inc., Chicago, Ill., a corporation of Illinois Application July 18, 1955, Serial No. 522,753

2 Claims. (Cl. 333—72)

This invention relates generally to filter units for selecting electrical signals, and more particularly to a filter unit including mechanical resonating elements and crystal resonating elements for providing a band pass response having very sharp sides which are accurately determined.

In electrical circuits, filters are used in many applications to provide selection of signal of predetermined frequency from sources including undesired frequencies with the desired frequencies. Such circuits have in general been composed of electrical elements such as condensers, inductors and resistors and by the use of a sufficient number of elements many different response characteristics can be obtained. While filters having precise characteristics can be formed from such components, to provide many characteristics a great number of components are required which result in high cost and relatively large size. Also, the components must be accurately adjusted to maintain a predetermined response and this adjustment is subject to variation by changes in temperature, mechanical vibration and other effects.

It has been proposed to form filters using vibrating mechanical elements constructed to resonate at the frequencies to be passed. While such mechanical filters have been found to be satisfactory in many applications, it has not been possible to determine the characteristics sufficiently accurately to meet certain very strict requirements. Similarly, piezoelectric crystal elements have been used in filters and such elements have been found to have very sharp selectivity. However, to provide many filter characteristics a large number of crystals are required and such crystals are relatively expensive resulting in overall structures which are quite high in cost.

It is therefore an object of the present invention to provide an improved filter having precise selectivity characteristics wherein the entire structure is of small and inexpensive construction.

A further object of the invention is to provide a filter for selecting electrical signals having a bandpass response characteristic with extremely steep sides.

Another object of the present invention is to combine the charactertistics of mechanical resonators and crystal resonators to provide a simple filter unit having desired characteristics for selecting electrical signals.

A feature of the invention is the provision of an electrical filter unit which includes mechanical resonators for providing bandpass selectivity with crystal units resonant at frequencies at the edges of the band for steepening the sides of the selectivity curve.

A further feature of the invention is the provision of a filter having mechanical resonators and crystal resonators with coupling means between the two providing a high impedance coupling for the crystal resonators.

Another feature of the invention is the provision of a filter having a characteristic with extremely sharp sides, which filter includes a plurality of mechanical resonators to provide the basic bandpass characteristics and a plurality of crystal resonators tuned to different close spaced frequencies at the edges of the band to steepen the sides of the characteristic curve.

Further objects, features and the attending advantages of the invention will be apparent from a consideration of the following description when taken with the accompanying drawings wherein, Fig. 1 is a schematic diagram of a filter in accordance with the invention;

Fig. 2 includes curves illustrating the operation of the filter of Fig. 1;

In practicing the invention there is provided a filter unit for selecting electrical signals within a predetermined frequency band including a plurality of mechanical resonators which respond to signals within the band and thereby pass these signals and attenuate signals outside the band. Coupling is made to the mechanical resonators through electromechanical devices which may include magnetostrictive plates positioned within coupling coils. The output of the mechanical filter is applied through an impedance matching device providing a high impedance coupling for the crystal elements. The crystal elements are in effect connected in parallel or shunt across the mechanical filter output and the crystals are cut to be resonant at frequencies at the edges of the passband of the mechanical filter. The crystals therefore sharply attenuate frequencies at the edge of the passband to provide an overall frequency characteristic having very steep sides. The overall characteristic of the filter may be controlled by the number and construction of the mechanical resonator plates and also by the number and frequency response of the crystal elements utilized. It has been found that a single crystal element on either side of the band of the mechanical filter is effective to substantially steepen the sides of the response curve so that by a very inexpensive construction a very sharp bandpass characteristic can be obtained. Additional mechanical resonators can be provided to increase the overall band selectivity, and additional crystal elements can be provided to further attenuate specific frequencies adjacent the band.

Figures 1, 2, 3, 4, 5, 6:
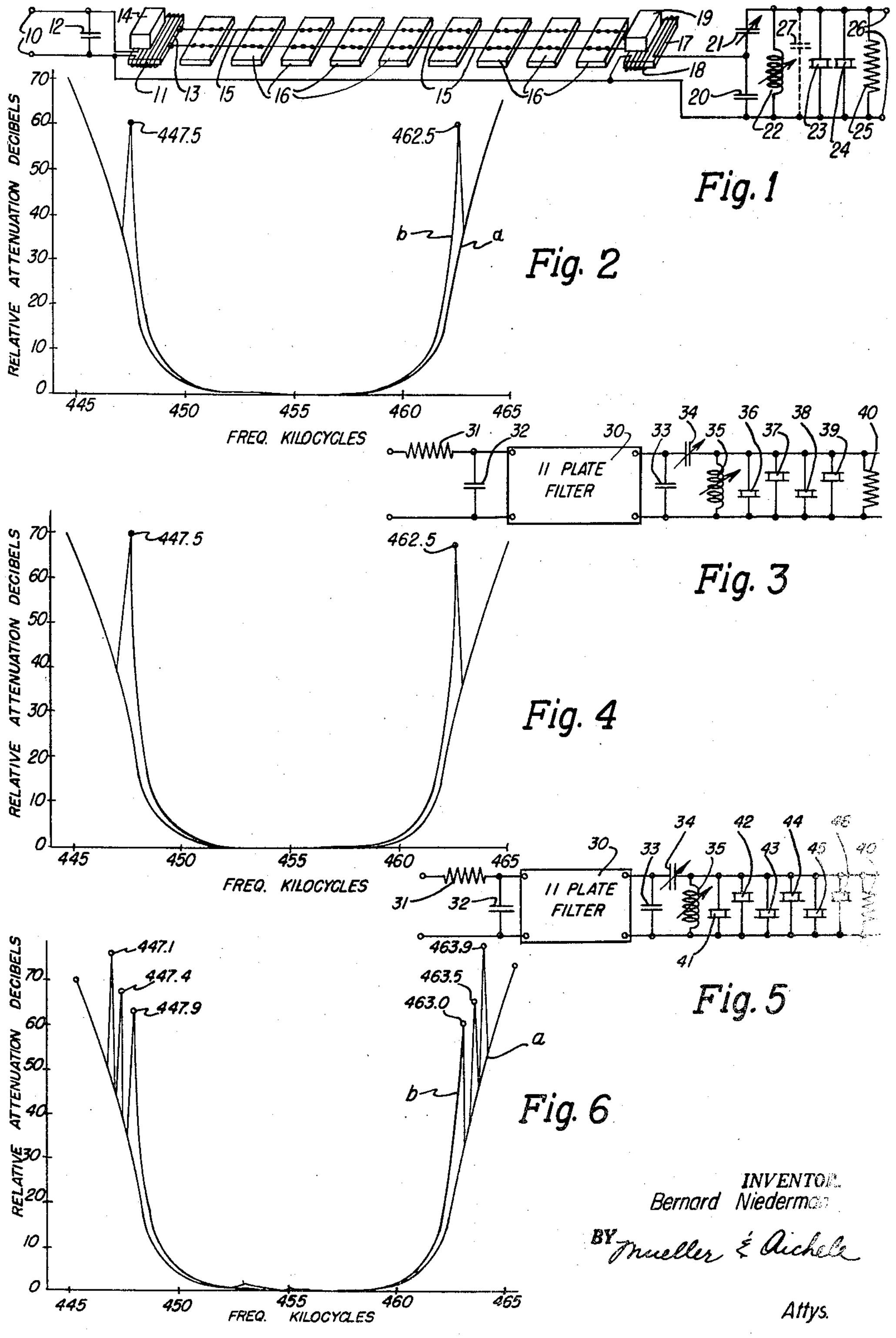
Figs. 3, 5 and 7 are schematic diagrams of other filter embodiments.
Figs. 4, 6 and 8 are curves illustrating the characteristics of the filters of Figs. 3, 5 and 7 respectively.

Referring now to the drawings, in Fig. 1 there is illustrated schematically a filter unit in accordance with the invention. The input to the filter is applied at terminals 10, with the signal being applied to coil 11 which is tuned by condenser 12. A magnetostrictive resonating plate 13 is provided within the coil 11 to convert the electrical signals into mechanical vibrations. A permanent magnet 14 provides a bias for the field produced by the signals so that the mechanical response properly follows the signals. The plate 13 is coupled by fine wires 15 to a plurality of intermediate plates 16 which have dimensions so that they respond to a desired frequency band. At the other end of the filter a second magnetostrictive plate 17 is provided which is positioned in coil 18 and within the influence of permanent magnet 19. Condenser 20 tunes the coil 18 to the frequency range involved. The mechanical filter structure may be in accordance with my prior application Serial No. 494,780 filed March 16, 1955.

The condenser 20 which is across coil 18 also cooperates with condenser 21 and coil 22 to form an impedance matching device for changing the relatively low impedance of the coil 18 to a higher impedance. The crystals 23 and 24 are connected across the high impedance circuit which is terminated by terminating resistor 25. The output of the filter is then derived from the terminals 26 connected to the ends of the resistor 25. The circuit connected to coil 22 and particularly the holders for the crystals 23 and 24 will provide added capacity across the coil 22 and this is illustrated schematically by the dotted condenser 27. This capacity must be considered in selecting the values for the impedance matching circuit.

Fig. 2 shows the response curve of the system of Fig. 1. The outer curve *a* is the curve of the mechanical filter with the magnetostrictive coupling thereto alone. It will be noted that the filter has a center frequency of 455 kilocycles and a bandpass of about 15 kilocycles. Although the sides of the response curve are relatively steep, the sides do have a substantial slope. The inner curve *b* is the response of the entire filter structure including the impedance matching circuit and the crystals 23 and 24. The crystals have series resonance frequencies of 447.5 and 462.5 kilocycles respectively and it will be noted that the curve *b* has maximum attenuation points at these frequencies. The sides of the curve *b* are much steeper than the curve *a* give very sharp frequency selectivity at the edges of the band.

The crystals and the matching circuit therefore establish the edge of the band of the filter. As the crystal frequencies can be accurately established the crystals will render the limits of the bandpass precise even though the characteristics of the mechanical filter itself may vary slightly due to manufacturing tolerances. In Figs. 1 and 2 the crystal frequencies are spaced by 15 kilocycles. The responses of the crystals are very sharp and narrow so that the curves return to the curve *a* at points beyond the crystal frequencies. The curve beyond these frequencies will be exactly the same as the curve of the mechanical filter alone. The improvement in the response resulting from the crystal filter may be extremely important in certain applications wherein it is desired to provide sharp attenuation at the edges of the band.

Fig. 3 illustrates a filter system generally like that of Fig. 1 including a mechanical filter 30 with an input coupling thereto including resistor 31 and condenser 32. The output of the filter is applied to the impedance matching circuit, formed of condensers 33 and 34 and inductor 35, which is similar to the impedance matching circuit in Fig. 1. Four crystals 36, 37, 38 and 39 are connected across the impedance matching circuit which is terminated by resistor 40. In this arrangement, two crystals are provided at each edge frequency of the desired passband. For example, the crystal 36 and 37 may be cut to have a frequency of 447.5 kilocycles and the crystals 38 and 39 may be cut to have a frequency of 462.5 kilocycles. By using two crystals on each edge of the band instead of one as in Fig. 1, the amount of attenuation at the edge frequencies is increased to thereby further steepen the sides of the response. The use of two crystals also somewhat widens the crystal response and this provides greater rejection of adjacent signals.

Fig. 5 shows a still further crystal construction generally similar to the circuits of Figs. 1 and 3. The mechanical filter unit 30 is the same as in previous embodiments and the input is applied through resistor 31 and across condenser 32 as previously described. Condensers 33 and 34 and inductor 35 provide an impedance matching device for providing a higher impedance for the crystals. In this structure six crystals 41, 42, 43, 44, 45 and 46 are provided. The filter is terminated in a resistor 40 as previously described. This arrangement provides three crystals at each edge of the band and although certain improvement would be provided by having the three crystals at each side at the same frequency, it may be also desirable to provide the three crystals at each side at different frequencies.

Curve 6 shows the response of the filter of Fig. 5 when the crystals are set at different frequencies. The outer curve *a* again shows the response of the 11 plate mechanical filter alone. The inner curve *b* shows the overall response of the entire filter unit. As noted in Fig. 6 three of the crystals are cut to have responses at 447.1, 447.4 and 447.9 kilocycles. This produces three attenuation wedges at the low frequency edge of the response curve. The three remaining crystals are cut at frequencies of 463.0, 463.5 and 463.9 to provide attenuation wedges at the high frequency side of the response curve. It will be noted that the crystals at 447.9 and 463.0 kilocycles are effective to define the main pass band and shift the same slightly so that the center frequency is moved above 455 kilocycles. Objectionable responses may be encountered beyond the bandpass curve resulting from the use of a single crystal on each side of the band, and attenuation for any adjacent frequencies may be provided by adding crystals cut at these frequencies. Accordingly, the filter response may be tailored to provide a predetermined bandpass characteristic.

Figure 7:
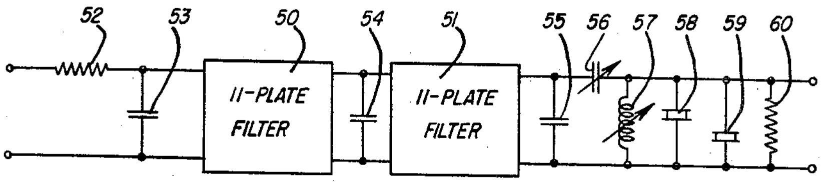

In Fig. 7 there is shown a still further embodiment which provides extremely sharp attenuation characteristics. In this circuit two eleven plate mechanical filters 50 and 51 are provided. These may be of identical construction and as the previous filters described may be in accordance with my prior application referred to above. The input to the mechanical filters is applied through resistor 52 with condenser 53 tuning the input coil of the filter 50. Condenser 54 tunes the output of the filter 50 and the input of the filter 51. At the output of the filter 51 there is provided an impedance matching device including condensers 55 and 56 and inductor 57. Two crystals 58 and 59 are bridged across the output circuit and the circuit is terminated in resistor 60.

Figure 8:
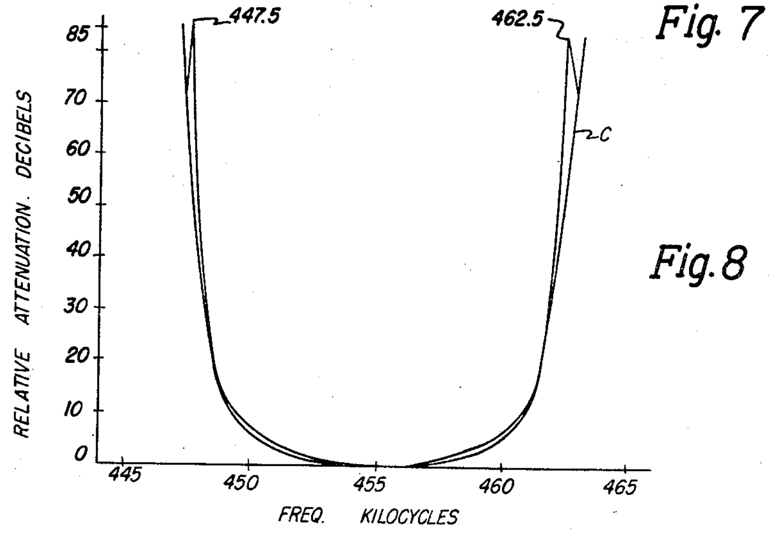

Curve *c* of Fig. 8 shows the characteristics of the two mechanical filters 50 and 51 without the addition of crystals. It will be noted that the filter has a center frequency of 455 kilocycles with the edges extending to slightly more than 16 kilocycles, and being attenuated by 85 decibels. The crystals 58 and 59 are cut to have frequencies of 447.5 and 462.5 kilocycles respectively. This narrows down the band width of the filter to 15 kilocycles and provides very steep sides producing sharp attenuation at the edges of the bandpass.

Figures 9, 10:
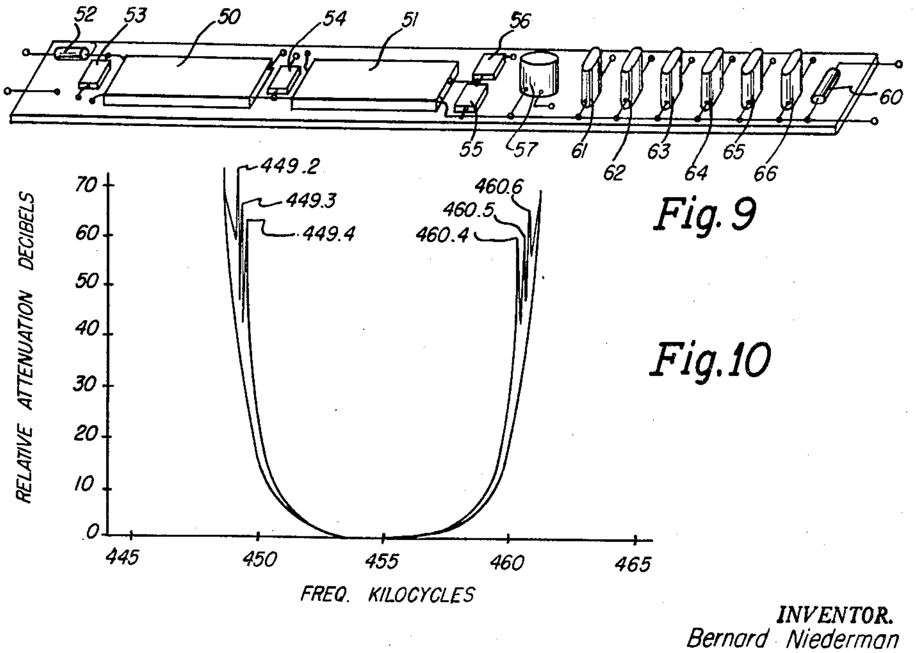
Fig. 9 illustrates a chassis portion including a filter in accordance with the invention.
Fig. 10 includes curves illustrating the operation of the filter of Fig. 9.

Fig. 9 shows a filter generally similar to that of Fig. 7, with Fig. 9 illustrating the appearance of a chassis having the components therein. The components are given the same reference numerals as the corresponding parts in Fig. 7. In Fig. 9 six crystals are provided, three at each edge of the band instead of one at each edge as in Fig. 7.

As shown by Fig. 10 the filter of Fig. 9 is constructed to have a center frequency of 455 kilocycles and a band width of 11 kilocycles. Accordingly, this filter has a narrower bandwidth than those previously described. The three crystals at each edge of the band are arranged generally in the manner shown in Figs. 5 and 6, with the three crystals at the low end being cut at frequencies of 449.2, 449.3 and 449.4 kilocycles. The crystals at the upper end are cut at frequencies of 460.4, 460.5 and 460.6 kilocycles respectively. It will be apparent that in a filter having such a sharp response the crystals are quite effective to steepen the sides and to narrow the band at an attenuation up to 60 decibels.

One important feature of the combined mechanical and crystal filter in accordance with the invention is the impedance matching circuit which provides a high impedance coupling to the crystals. This reduces the attenuation produced by the crystals. The impedance step up device also provides voltage step up to thereby provide a higher output voltage. The tuning of this circuit affects the voltage attenuation and bandwidth of the overall unit, with an increase in bandwidth reducing the voltage gain. The high impedance termination is particularly desirable when the filter is used to feed the grid of a tube wherein a high impedance input is advantageous.

Considering the filter of Fig. 1 which includes a single 11 plate mechanical filter and one crystal at each end of the band, the insertion loss of the unit is of the order of 20 decibels and the voltage attenuation when using a terminating resistor 25 of 560,000 ohms is only 1 decible. When using a lower impedance termination of 100,000 ohms the voltage attenuation is 5 decibels. In the system of Fig. 3 having two crystals at each edge of the band, the insertion loss is substantially the same, but the voltage attenuation is somewhat greater. The system of Fig. 6 having three crystals at each edge of the band cut at different frequencies results in an insertion loss of 20 decibels and a voltage attenuation of 15 decibels.

The filter systems using two eleven plate mechanical filters, have increased insertion loss with the insertion loss being of the order of 40 decibels. When using a single crystal on each edge of the band as shown in Fig. 7, the voltage attenuation is only 5 decibels. When using three crystals on each edge as shown in Fig. 9 the voltage attenuation is of the order of 32 decibels.

The various characteristics of the filter given above depend, of course, upon the specific construction of the components. The values given are merely representative of structures which have been built and tested. It will be obvious that the filters can be constructed in various manners to provide the response characteristics which may be required for particular applications.

The overall filter structure may be of extremely small and inexpensive construction. As will be apparent from Fig. 9 the chassis space required for a filter structure having two mechanical units and six crystals may be very small requiring chassis space only 1 inch in width and 6 inches in length and less than an inch in depth. Simple filters including a single mechanical unit and two crystals can of course be provided in a much smaller space. The mechanical filter construction as disclosed in my prior application Serial No. 494,780 referred to above is extremely simple and provides a very inexpensive unit. The crystals may be standard commercial units and may be provided with plug-in mountings so that replacement is easily accomplished. The overall structure is much less expensive and much more compact than filters formed by electrical circuit elements such as inductors, condensers and resistors which provide the same overall characteristics.

As previously stated, the crystals act to both steepen the sides of the response characteristics of the mechanical filter and to establish the frequencies at the ends of the frequency band. Accordingly, the filter characteristic is improved and the mechanical filter construction is rendered somewhat less critical since the end frequencies are established by the crystals. Although the crystals are illustrated as connected in shunt across the output of the electromechanical filter, the crystals may be connected in other ways to provide characteristics as may be desired.

I claim:

1. A filter unit for selecting electrical signals within a predetermined frequency band including in combination, an electromechanical unit including a plurality of coupled mechanical vibrating elements constructed to respond to frequencies within the band, said elements being connected in cascade with the end elements being made of magnitostrictive material, and low impedance electrical coupling means cooperating with said magnitostrictive end elements for moving said vibrating elements in accordance with electrical signals and for producing signals in response to movement of said vibrating elements, said electromechanical unit providing a band pass characteristic with sloping sides, first and second piezoelectric crystal elements constructed to respond to frequencies at the edges of the passband of said electromechanical unit, and circuit means connecting said crystal elements to said electrical coupling means, said circuit means including tuned impedance transforming means having inductor and capacitor elements and providing a high impedance coupling for said crystal elements for effectively connecting said crystal elements in parallel across said coupling means of said electromechanical unit, said transforming means being adjustable and compensating for the capacitance of said crystal elements, whereby the band pass characteristics of the complete filter unit follows generally the band pass characteristics of the electromechanical unit with the sides of the filter unit characteristic being made steeper by action of the crystal elements.

2. A filter unit in accordance with claim 1 including first and second sets of piezo-electric crystal, with each set including a plurality of elements constructed to respond to frequencies spaced along one sloping side of said band pass characteristic of said electromechanical unit, and with said crystal elements of said first and second sets being connected in parallel to said impedance transforming means.

References Cited in the file of this patent

UNITED STATES PATENTS

| | | |
|---|---|---|
| 1,794,847 | Green | Mar. 3, 1931 |
| 2,266,658 | Robinson | Dec. 16, 1941 |